March 2, 1948.   J. H. ANDRESEN, JR   2,437,064
TWO-PHASE MOTOR CONTROL
Filed Jan. 29, 1946

INVENTOR.
JOHN H. ANDRESEN jr
BY
ATTORNEY

Patented Mar. 2, 1948

2,437,064

UNITED STATES PATENT OFFICE 2,437,064

TWO-PHASE MOTOR CONTROL

John H. Andresen, Jr., Port Washington, N. Y., assignor to Square D Company, Detroit, Mich., a corporation of Michigan Application January 29, 1946, Serial No. 644,136

10 Claims. (Cl. 318—31)

This invention relates to a reversing control for an electrical motor and more particularly to the control of the driving motor of a follow-up system.

An object of the invention is to provide a simple and effective means for effecting the control of the direction of rotation of an electrical motor.

Another object of the invention is to provide a simple reversing control for an electrical motor operating from a single set of cooperating contacts.

Another object of the invention is the provision of a reversing control for an electrical motor operated by the firing of a single electronic tube under the control of a single set of cooperating contacts.

Another object of the invention is the provision of a simplified reversing control for the driving motor of a follow-up system providing for the application of substantial torques without loading a sensitive condition responsive instrument.

Other objects and features of the invention will be readily apparent to those skilled in the art from the specification and appended drawings illustrating certain preferred embodiments in which.

Figure 1:
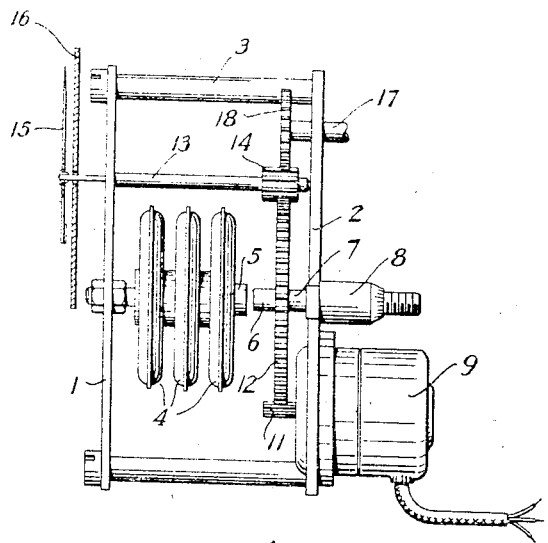
Figure 1 is a schematic representation of the follow-up system applied to a barometric pressure responsive instrument.

The follow-up system according to the present invention has been specifically illustrated in the drawings as applied to a barometric pressure responsive instrument such as an altimeter. As specifically shown in Figure 1, the instrument comprises a pair of mounting plates 1 and 2 spaced apart by rods 3. Upon the plate 1 is mounted a series of aneroid capsules 4 expanding and contracting in response to change in external pressure. Carried by the aneroid capsules 4 and movable thereby is an electrical contact 5 shown as having an appreciable surface area. Cooperating with the contact 5 is a second contact 6 mounted upon a shaft 7 threaded within a stationary sleeve 8 mounted on the plate 2 so that rotation of the shaft 7 will effect longitudinal movement thereof. Also mounted on the plate 2 is a two phase driving motor 9 whose shaft terminates in a pinion 11 meshing with a gear 12 rigidly mounted on the shaft 7. Journalled in the plates 1 and 2 is a shaft 13 carrying a pinion 14 meshing with the gear 12. Upon the end of the shaft 13 is a pointer 15 cooperating with pressure or altitude indicia on a dial 16. A power take-off shaft is indicated at 17 journalled in the plate 2 and having a gear 18 rigidly mounted thereon meshing with the pinion 14.

Figure 2:
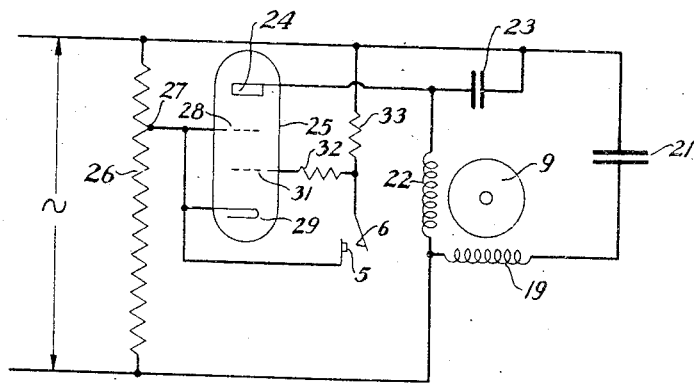
Figure 2 is a wiring diagram of the reversing control for the electrical motor of the follow-up system.

The reversing control for the motor 9 is shown in Figure 2 wherein the motor 9 is provided with a two phase winding, one of which, indicated at 19, is connected through condenser 21 across the alternating current supply. The second phase winding of the motor 9, indicated at 22, is connected to the alternating current supply through a parallel circuit, one leg of which includes the condenser 23 and with the other leg connected to the plate 24 of an electronic tube 25. A high resistance voltage divider 26 is provided across the supply and to a point 27 adjacent one end thereof are connected the suppressor grid 28 of the tube 25, its cathode 29 and the contact 5 on the condition responsive instrument. The control grid 31 of tube 25 is connected through grid protective resistor 32 to the contact 6 on the follow-up system and through grid bias resistor 33 to the supply.

The values of the condensers 21 and 23 are selected to provide the desired current time-phase reversal upon firing of the electronic tube 25. As a specific example, with a 400 cycle alternating current supply and the motor 9 a small two phase motor supplying 0.5" of stalled rotor torque, the condenser 21 is provided with a capacity of 0.3 mf. and the condenser 23 a capacity of 0.1 mf. It will be understood, of course, that these values will not only vary for different motors and varied frequency of the alternating current supply but that their ratio is not critical so long as the values are within the ranges to secure a reversal in phase of the current through the motor winding.

The operation of the follow-up system is to provide for movement of the contact 6 in opposite directions as the contact 5 moves in opposite directions so that the contacts are maintained either just engaging, or a slight distance apart as will be hereinafter explained, so that the pointer 15 and the shaft 17 follow the movement of the aneroid capsules 4 without placing a load thereon. Such systems are necessary where it is desired to exert an appreciable force in response to the operation of sensitive condition responsive elements whose characteristics would be changed by the imposition of loading thereon. With the follow-up system as shown in Figure 1, the torque applied by shaft 17 is limited only by the power of the motor 9 without loading the aneroid capsules 4 and hence while retaining their sensitivity.

Figure 3:
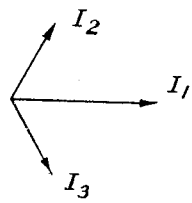
Figure 3 is a vector representation of the currents in the windings of the motor in its opposite directions of rotation.

The reversal of the direction of rotation of the motor 9 is effected by the firing of the electronic tube 25 by engagement of the contacts 5 and 6. When the contacts are disengaged, the motor 9 will rotate in one direction and the currents in the windings 19 and 22 are represented by the current vectors $I_1$ and $I_2$, respectively, in Figure 3 since the winding 22 is fed through the condenser 23 having a lower capacity than the condenser 21 so that the current and winding 22 will lead in phase the current in winding 19. When the contacts 5 and 6 engage, the voltage applied to the grid 31 effects a firing of the tube 25 and connects the winding 22 to the alternating current supply through what is substantially a resistive exterior circuit, the circuit of winding 22 being then from one side of the line through the winding, the tube 25 and through the small portion of the voltage dividing resistance 26 to the opposite side of the line. The current in winding 22 while tube 25 is firing is indicated by the voltage vector $I_3$ which now follows in phase the current in winding 19 and hence the phase reversal effects a reversal of the direction of rotation of the motor 9. With the control used in a follow-up system such as shown by way of example in Figure 1, the operation will be such as to effect intermittent firing of the tube 25 to rotate the shaft 7 in the proper direction to maintain the contacts 5 and 6 closely together. It will, of course, be understood that the reversing control is of general application other than in follow-up systems.

The contacts 5 and 6 may be point contacts in which the firing of the electronic tube is effected by their actual engagement or when provided with a considerable surface area such as indicated in Figure 1, the capacity of the condenser represented by the contacting surfaces and the dielectric air therebetween is sufficient to effect firing of the electronic tube before actual physical engagement of the contacting surface is effected. This is desirable in certain instances where actual physical engagement between the contacting surfaces would result in wear or pitting of the surfaces which might impair the accuracy of the device.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. In a motor control system for controlling the direction of rotation of a two phase motor fed from a single phase alternating current source, means for feeding one phase of the motor from the source through a condenser, means for feeding the second phase of the motor from the source through a second condenser having a lower capacity than said first-mentioned condenser so that the current in the second phase of the motor leads the current in said one phase of the motor in time-phase relation to produce motor rotation in one direction, and means for feeding said second phase from the supply through a circuit of substantially no capacity so as to produce a current in said second phase following in time-phase relation the current in said one phase to effect a rotation of the motor in the opposite direction.

2. In a motor control system for controlling the direction of rotation of a two phase motor fed from a single phase alternating current supply, a first condenser through which the first phase of said motor is fed, a second condenser through which the second phase of the motor is fed to effect rotation of the motor in one direction, said second condenser being of substantially lower capacity than said first condenser so as to effect a flow of current through said first phase leading in time-phase relation the current in said first phase, and a circuit of substantially no capacity through which said second phase is fed to effect rotation of the motor in the opposite direction with the current flowing in said second phase lagging in time-phase relation the current in said first phase.

3. In a motor control system for controlling the direction of rotation of a two phase motor fed from a single phase alternating current supply, a first condenser connected in series with the first phase of said motor, a second condenser connected in series with the second phase of the motor, said second condenser being of substantially lower capacity than said first condenser so as to effect a flow of current through said second phase leading in time-phase relation the current in said first phase to produce motor rotation in one direction, and means for by-passing said second condenser with a circuit of substantially no capacity so as to effect flow of current in said second phase lagging in time-phase relation the current in said first phase whereby to effect rotation of the motor in the opposite direction.

4. In a motor control system for controlling the direction of rotation of a two phase motor fed from a single phase alternating current supply, a first condenser connected in series with the first phase of said motor, a second condenser connected in series with the second phase of the motor, said second condenser being of substantially lower capacity than said first condenser so as to effect a flow of current through said second phase leading in time-phase relation the current in said first phase to produce motor rotation in one direction, a circuit including an electronic tube by-passing said second condenser, and means for firing said electronic tube to effect flow of current in said second phase lagging in time-phase relation the current in said first phase whereby to effect rotation of the motor in the opposite direction.

5. In a motor control system for controlling the direction of rotation of a two phase motor fed from a single phase alternating current supply, a first condenser connected in series with the first phase of said motor, a second condenser connected in series with the second phase of the motor, said second condenser being of substantially lower capacity than said first condenser so as to effect a flow of current through said second phase leading in time-phase relation the current in said first phase to produce motor rotation in one direction, a circuit including an electronic tube by-passing said condenser, a first contact having a variable position, a second contact whose position relative to said first contact is controlled by the motor, said contacts controlling the firing of said electronic tube to effect flow of current in said second phase lagging in time-phase relation the current in said first phase whereby to effect rotation of the motor in the opposite direction.

6. In a motor control system for controlling the direction of rotation of a two phase motor fed from a single phase alternating current supply, a first condenser connected in series with the first phase of said motor, a second condenser connected in series with the second phase of the motor, said second condenser being of substantially lower capacity than said first condenser so as to effect a flow of current through said second phase leading in time-phase relation the current in said first phase to produce motor rotation in one direction, a circuit of substantially no capacity by-passing said second condenser, and a single set of cooperating contacts controlling the connection and disconnection of said circuit to control the direction of rotation of the motor, the circuit when connected effecting flow of current in said second phase lagging in time-phase relation the current in said first phase.

7. In a motor control system for controlling the direction of rotation of a two phase motor fed from a single phase alternating current supply, a first condenser connected in series with the first phase of said motor, a second condenser connected in series with the second phase of the motor, said second condenser being of substantially lower capacity than said first condenser so as to effect a flow of current through said second phase leading in time-phase relation the current in said first phase to produce motor rotation in one direction, a circuit of substantially no capacity by-passing said second condenser, a single set of cooperating contacts controlling the connection and disconnection of said circuit to control the direction of rotation of the motor, the circuit when connected effecting flow of current in said second phase lagging in time-phase relation in current in said first phase, means mounting one of said contacts for movement, and means mounting the other of said contacts for movement by said motor to follow the movement of said one of said contacts.

8. In a follow-up system, condition responsive means, a first contact movable in response to movement of said condition responsive means, a second contact cooperating with said first contact and movable to maintain its relation therewith, an electric motor for effecting movement of said second contact in opposite directions as the motor is rotated in opposite directions, a two phase winding for said motor, a first condenser in series with the first phase of said motor, a second condenser in series with the second phase of said motor, said second condenser having a substantially lower capacity than said first condenser, and a circuit controlled by said first and second contacts to feed said second phase with current lagging in time-phase relation the current in said first phase.

9. In a follow-up system, condition responsive means, a first contact movable in response to movement of said condition responsive means, a second contact cooperating with said first contact and movable to maintain its relation therewith, an electric motor for effecting movement of said second contact in opposite directions as the motor is rotated in opposite directions, a two phase winding for said motor, a first condenser in series with the first phase of said motor, a second condenser in series with the second phase of said motor, said second condenser having a substantially lower capacity than said first condenser, a circuit controlled by said first and second contacts to feed said second phase with current lagging in time-phase relation the current in said first phase, and a power take-off shaft driven by said motor and adapted to supply a substantial torque without loading said condition responsive means.

10. In a follow-up system, condition responsive means, a first contact movable in response to movement of said condition responsive means, a second contact cooperating with said first contact and movable to maintain its relation therewith, an electric motor for effecting movement of said second contact in opposite directions as the motor is rotated in opposite directions, a two phase winding for said motor, a first condenser in series with the first phase of said motor, a second condenser in series with the second phase of said motor, said second condenser having a substantially lower capacity than said first condenser, and a circuit controlled by said first and second contacts to feed said second phase with current lagging in time-phase relation the current in said first phase, said circuit including an electronic tube, the energization of the control grid of which is effected by said first and second contacts.

JOHN H. ANDRESEN, Jr.

REFERENCES CITED

The following references are of record in the file of this patent:

UNITED STATES PATENTS

| Number | Name | Date |
|---|---|---|
| 1,160,679 | Wilkinson | Nov. 16, 1915 |
| 1,664,265 | Rieber | Mar. 27, 1928 |
| 2,355,567 | Sparrow | Aug. 8, 1944 |